(12) United States Patent
Wang et al.

(10) Patent No.: US 12,086,693 B2
(45) Date of Patent: Sep. 10, 2024

(54) COMPENSATING FOR OUT-OF-PHASE SEASONALITY MODES IN TIME-SERIES SIGNALS TO FACILITATE PROGNOSTIC-SURVEILLANCE OPERATIONS

(71) Applicant: Oracle International Corporation, Redwood Shores, CA (US)

(72) Inventors: Guang C. Wang, San Diego, CA (US); Kenny C. Gross, Escondido, CA (US)

(73) Assignee: Oracle International Corporation, Redwood City, CA (US)

( * ) Notice: Subject to any disclaimer, the term of this patent is extended or adjusted under 35 U.S.C. 154(b) by 1197 days.

(21) Appl. No.: 16/419,846

(22) Filed: May 22, 2019

(65) Prior Publication Data

US 2020/0372385 A1  Nov. 26, 2020

(51) Int. Cl.
*G05B 23/02* (2006.01)
*G06F 17/10* (2006.01)
(Continued)

(52) U.S. Cl.
CPC ......... *G06N 20/00* (2019.01); *G05B 23/0218* (2013.01); *G05B 23/0283* (2013.01);
(Continued)

(58) Field of Classification Search
CPC .......... G06N 7/005; G06N 20/00; G06N 7/01; G06V 10/478; G05B 23/0218;
(Continued)

(56) References Cited

U.S. PATENT DOCUMENTS

2003/0018928 A1* 1/2003 James ................. G06F 11/2263
714/E11.158
2007/0027656 A1* 2/2007 Baraniuk ............... H03M 7/30
702/189

(Continued)

OTHER PUBLICATIONS

Reegen (Frequency- and phase-resolved significance in Fourier space, Institute for Astronomy, Universität Wien, Türkenschanzstraße 17, 1180 Vienna, Austria e-mail: reegen@astro.univie.ac.at, Mar. 2007 (Year: 2007).*

(Continued)

*Primary Examiner* — Mohamed Charioui
*Assistant Examiner* — Dacthang P Ngo
(74) *Attorney, Agent, or Firm* — Park, Vaughan, Fleming & Dowler LLP (57) ABSTRACT

The disclosed embodiments provide a system that performs seasonality-compensated prognostic-surveillance operations for an asset. During operation, the system obtains time-series sensor signals gathered from sensors in the asset during operation of the asset. Next, the system identifies seasonality modes in the time-series sensor signals. The system then determines frequencies and phase angles for the identified seasonality modes. Next, the system uses the determined frequencies and phase angles to filter out the seasonality modes from the time-series sensor signals to produce seasonality-compensated time-series sensor signals. The system then applies an inferential model to the seasonality-compensated time-series sensor signals to detect incipient anomalies that arise during operation of the asset. Finally, when an incipient anomaly is detected, the system generates a notification regarding the anomaly.

20 Claims, 10 Drawing Sheets

(51) Int. Cl.
*G06N 7/01* (2023.01)
*G06N 20/00* (2019.01)
*H04L 9/40* (2022.01)

(52) U.S. Cl.
CPC ............... *G06F 17/10* (2013.01); *G06N 7/01* (2023.01); *H04L 63/1425* (2013.01)

(58) Field of Classification Search
CPC ..... G05B 23/0283; G06F 17/10; G06F 17/18; H04L 63/1425
See application file for complete search history.

(56) References Cited

U.S. PATENT DOCUMENTS

| | | | |
|---|---|---|---|
| 2009/0295561 A1* | 12/2009 | Hu .................... | G05B 19/41875 340/501 |
| 2013/0339418 A1* | 12/2013 | Nikitin ............... | H03H 21/0001 708/819 |
| 2018/0039898 A1* | 2/2018 | Saini ..................... | G06F 21/554 |
| 2018/0060151 A1* | 3/2018 | Gross ................... | G06F 21/552 |
| 2019/0129821 A1* | 5/2019 | Lee ..................... | G06F 11/3452 |

OTHER PUBLICATIONS

John et al ("How to calculate phase shift", Mar. 2018 ) (Year: 2018).*

* cited by examiner

|  | Ground Truth (# obs) | CPSD Estimate (# obs) | Difference (# obs) |
|---|---|---|---|
| Mode 1 | -10 | -10.03 | 0.03 |
| Mode 2 | -20 | -20.03 | 0.03 |
| Mode 3 | 0 | 0.418 | 0.418 |

COMPENSATING FOR OUT-OF-PHASE SEASONALITY MODES IN TIME-SERIES SIGNALS TO FACILITATE PROGNOSTIC-SURVEILLANCE OPERATIONS

BACKGROUND

Field

The disclosed embodiments generally relate to techniques for performing prognostic-surveillance operations for critical assets based on associated time-series sensor signals. More specifically, the disclosed embodiments relate to a technique for preprocessing time-series sensor signals from a critical asset to compensate for out-of-phase seasonality modes to improve subsequent prognostic-surveillance operations based on the time-series sensor signals.

Related Art

Large numbers of sensors are presently being deployed to perform "prognostic-surveillance" operations to monitor the operational health of critical assets. For example, a medium-sized computer data center can include over 1,000,000 sensors monitoring thousands of business-critical servers, a modern passenger jet can include 75,000 sensors, and an oil refinery can include over 1,000,000 sensors. These sensors produce time-series sensor signals, which can be used to perform prognostic-surveillance operations for the systems. These prognostic-surveillance operations make it possible to detect incipient anomalies that arise during operation of a monitored system, wherein the incipient anomalies can provide early warning about an impending failure of the monitored system.

The time-series sensor signals include both stochastic and deterministic components. When the deterministic components are periodic, they are referred to as "seasonality modes." The ability to detect anomalies in such time-series sensor signals can be greatly enhanced by filtering out these seasonality modes. Sophisticated seasonality-characterization techniques have been developed over the last several decades and have become commonplace. However, these traditional seasonality-characterization techniques perform poorly when there exist multiple superimposed seasonality modes, and where the modes are out of phase with each other. This is because traditional seasonality-characterization techniques assume that if there exist multiple seasonality modes, the modes are all in phase with each other. Traditional seasonality-characterization techniques also perform poorly when the number of seasonality modes is not known a priori, and when the lead and lag times among the multiple seasonality modes change dynamically over time.

Hence, what is needed is a technique for preprocessing time-series sensor signals to identify and then filter out seasonality modes.

SUMMARY

The disclosed embodiments provide a system that performs seasonality-compensated prognostic-surveillance operations. During operation, the system obtains time-series sensor signals (S1) gathered from sensors in an asset during operation of the asset. Next, the system identifies seasonality modes in the time-series sensor signals. The system then determines frequencies and phase angles for the identified seasonality modes. Next, the system uses the determined frequencies and phase angles to filter out the seasonality modes from the time-series sensor signals to produce seasonality-compensated time-series sensor signals. The system then applies an inferential model to the seasonality-compensated time-series sensor signals to detect incipient anomalies that arise during operation of the asset. Finally, when an incipient anomaly is detected, the system generates a notification regarding the anomaly.

In some embodiments, while applying the inferential model to the seasonality-compensated time-series sensor signals, the system uses the inferential model to generate estimated values for the seasonality-compensated time-series sensor signals. Next, the system performs a pairwise differencing operation between actual values and the estimated values for the seasonality-compensated time-series sensor signals to produce residuals. Finally, the system performs a sequential probability ratio test on the residuals to detect the incipient anomalies that arise during operation of the asset.

In some embodiments, prior to obtaining the time-series sensor signals, the system trains the inferential model. During this training process, the system obtains optimal time-series sensor signals gathered from sensors in the asset during optimal, error-free operation of the asset. Next, the system identifies seasonality modes in the optimal time-series sensor signals, and also determines associated frequencies and phase angles for the identified seasonality modes. The system then uses the determined frequencies and phase angles to filter out the seasonality modes from the optimal time-series sensor signals to produce seasonality-compensated optimal time-series sensor signals. Finally, the system trains the inferential model using the seasonality-compensated optimal time-series sensor signals.

In some embodiments, while identifying the seasonality modes in the time-series sensor signals, the system determines serial correlations for the time-series sensor signals. Next, the system decomposes the serial correlations into an envelope of overlapping sinusoids. The system then uses the envelope of overlapping sinusoids to construct a corresponding Fourier composite (S2). Next, the system determines a magnitude-squared coherence between S1 and S2. Finally, the system applies a Heaviside step function to the magnitude-squared coherence to produce N steps, wherein each step is associated with a seasonality mode.

In some embodiments, while determining the associated frequencies and phase angles for the identified seasonality modes, the system computes a cross power spectral density (CPSD) of S1 and S2. Next, for each step i of the N steps produced by the Heaviside step function, the system performs the following operations. First, the system retrieves a maximum magnitude-squared coherence for step i. The system then determines a frequency associated with the maximum magnitude-squared coherence. Finally, the system uses the computed CPSD to determine a phase angle associated with the determined frequency.

In some embodiments, while using the determined frequencies and phase angles to filter out the seasonality modes, the system converts each phase angle into a corresponding lead/lag time by dividing each phase angle by an associated frequency.

In some embodiments, the inferential model comprises a Multivariate State Estimation Technique (MSET) model.

In some embodiments, the incipient anomalies comprise indicators of an impending failure of the asset.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Seasonality-characterization techniques originally emerged from the field of econometrics almost a century ago when financial analysts were tracking sales trends, tax revenues, agricultural prices and revenues, and many other finance metrics. It was econometricians who first realized that all the data they worked with had strong seasonality components, and to understand trends in these metrics, they needed techniques to identify and "correct for" seasonality. This historical background is relevant because seasonality-characterization techniques originated with economics, and economic seasonality modes are always "in phase," comprising daily diurnal cycles, weekly cycles, quarterly cycles, and annual cycles. For this reason, traditional seasonality-characterization techniques perform poorly when: (1) there exist multiple superimposed seasonality modes, and the modes are out of phase with each other; (2) the number of seasonality modes is not known a priori; and (3) the lead and lag times among the multiple seasonality modes change dynamically over time.

For machine-learning-based (ML-based) prognostic-surveillance techniques, it is important that the time-series signals from various distributed sensors, components, subsystems, and integrated systems be in phase. This is hard to ensure because of clock-mismatch issues. Historically, when a system under surveillance only had a few sensors, the signals from the system were sampled with timestamps generated by one clock. However, along with the recent dramatic increase in sensors, there often exist multiple data-acquisition modules (DAQs) with their own clocks. These clocks are often not well synchronized due to calibration errors when the clocks were initially set up, and also other clock-drift mechanisms that cause variable clock skew. These clock skew problems generally cause associated prognostic-surveillance techniques to perform very poorly.

Multiple seasonality modes commonly arise in many types of critical assets. For example, electro-mechanical assets commonly have active internal and/or external cooling systems, and also dynamic load cycles. Consequently, the associated internal telemetry parameters (e.g., distributed temperatures, voltages, currents, fan speeds, vibrations, component power metrics, etc.) contain superimposed dynamic components, which are not likely to be synchronized. Also, the lead/lag relationships among the multiple seasonality modes can change dynamically with time.

Our new technique makes use of a CPSD-based technique, which operates in the frequency domain to determine the phase shifts in the seasonality modes in the time-series signals. This new technique works with high accuracy even when there exist multiple modes of seasonality with variable lead/lag relationships.

Figure 2A:
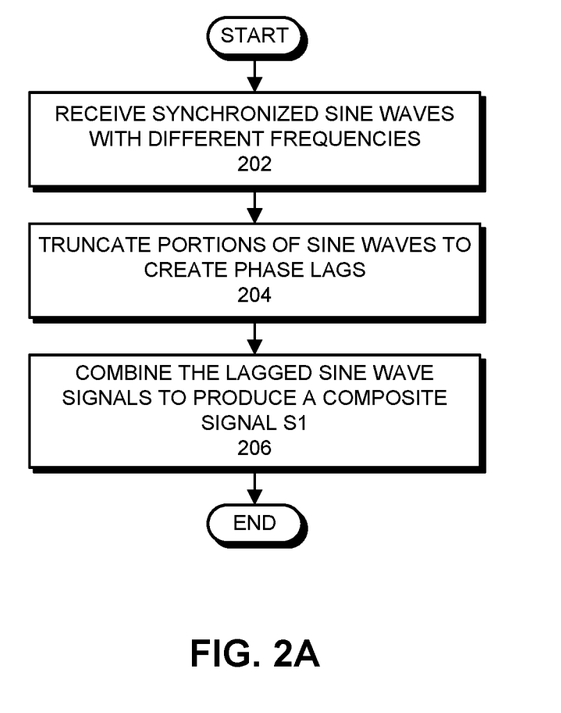
FIG. 2A presents a flow chart illustrating operations involved in generating a composite signal from sine waves in accordance with the disclosed embodiments.

To test this technique, we first generate a synthetic composite signal from sine waves using the process illustrated in the flow chart that appears in FIG. 2A. During this process, we receive synchronized sine waves with different frequencies (step 202). Next, we truncate portions of the sine waves to create phase lags (step 204). Finally, we combine the lagged sine wave signals to produce a composite signal S1 (step 206).

Figure 3:
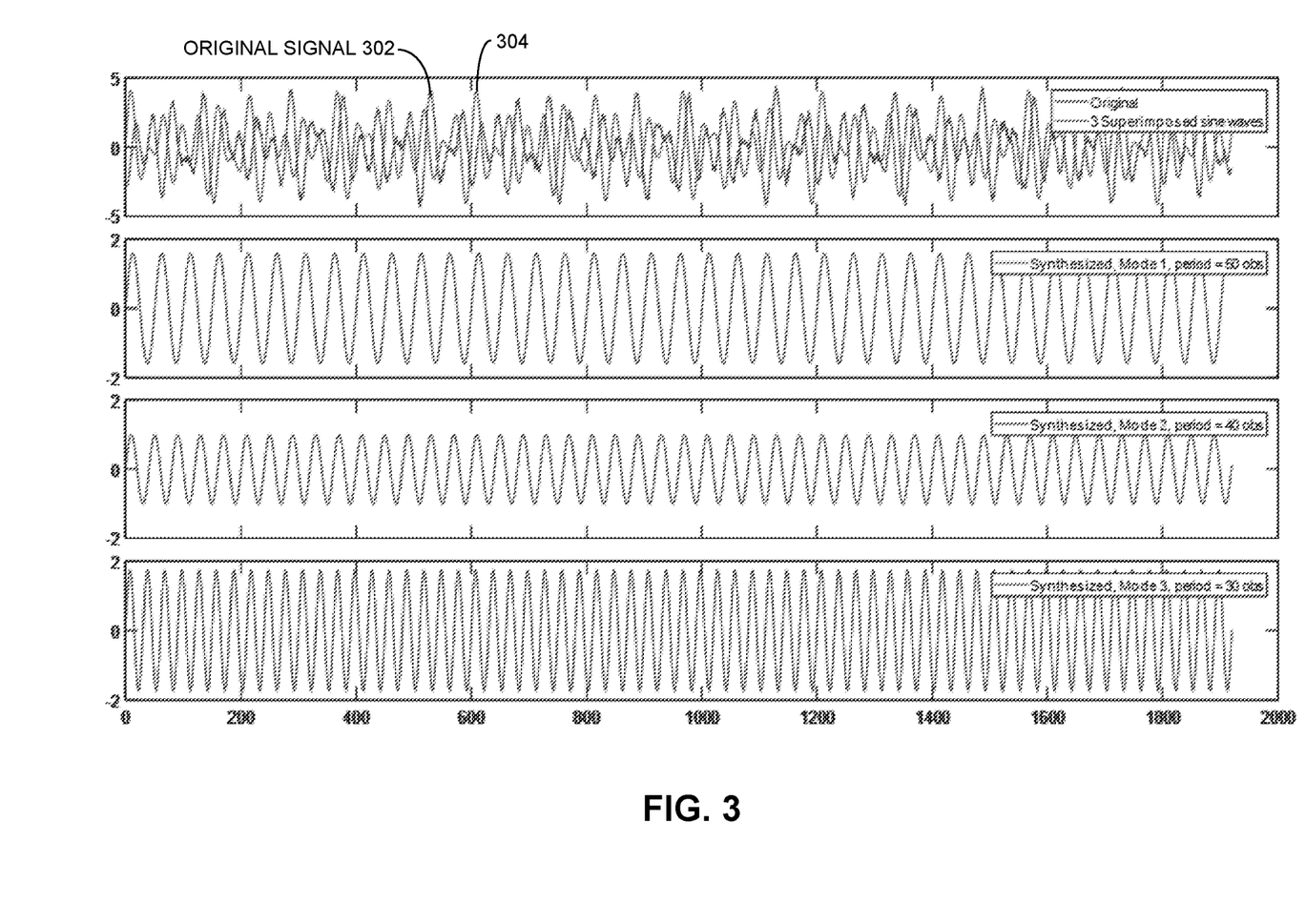
FIG. 3 presents graphs illustrating how the composite signal is generated from sine waves in accordance with the disclosed embodiments.

Results of this process are illustrated in the graphs that appear in FIG. 3. More specifically, FIG. 3 illustrates an original signal 302, which is comprised of 2000 observation points representing three synchronized sine waves. The first, second and third sine waves have periods of 30, 40, 100 observation points, respectively, and are illustrated in the three lower graphs that appear in FIG. 3. We truncate the first 80 observation points to cause the sinusoidal waves to be out-of-phase, which produces ground truth lead times for three sine waves of −10, 0, and −20 observation points, respectively. We then perform a CPSD analysis on the resulting signal, and also perform serial correlation and sinusoid decomposition to form a Fourier composite. The resulting Fourier composite of the testing signal appears as signal 304 in the top graph in FIG. 3.

Figure 2B:
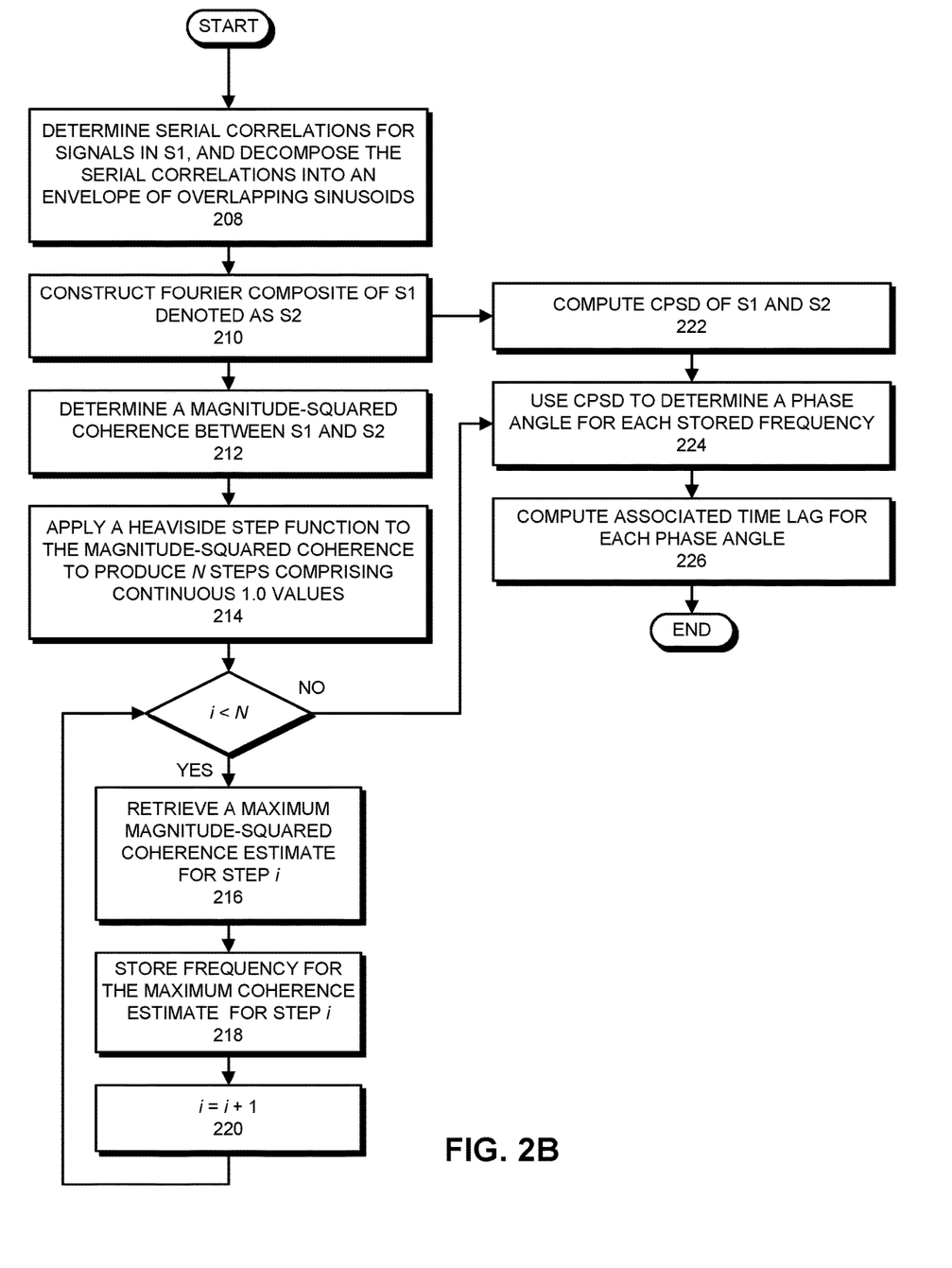
FIG. 2B presents a flow chart illustrating operations involved in determining frequencies and associated time lags for seasonality modes in accordance with the disclosed embodiments.

During the seasonality-characterization process, we determine frequencies and associated time lags for each of the seasonality modes. For example, FIG. 2B presents a flow chart illustrating operations involved in determining frequencies and associated time lags for multiple seasonality modes in accordance with the disclosed embodiments. This process starts with time-series sensor signals (S1) gathered from sensors in an asset during operation of the asset. During operation, the system first determines serial correlations for signals in S1, and decomposes the serial correlations into an envelope of overlapping sinusoids (step 208). Next, the system computes a Fourier composite of S1, which is denoted as S2 (step 210). The system then computes a CPSD of S1 and S2 (step 222). While the CPSD is being computed, the system determines a magnitude-squared coherence between S1 and S2 (step 212), and applies a Heaviside step function to the magnitude-squared coherence to produce N steps comprising continuous 1.0 values (step 214). Next, the system iteratively executes the following operations for each of the N steps using a loop with a counter i, wherein i starts with the value 1. First, the system retrieves a maximum magnitude-squared coherence estimate for step i (step 216). Next, the system stores a frequency for the maximum coherence estimate for step i (step 218). The system then increments the loop counter i=i+1 (step 220). Next, the system uses the CPSD computed in step 222 to determine a phase angle for each stored frequency (step 224), and computes an associated time lag for each phase angle (step 226).

Figure 4:
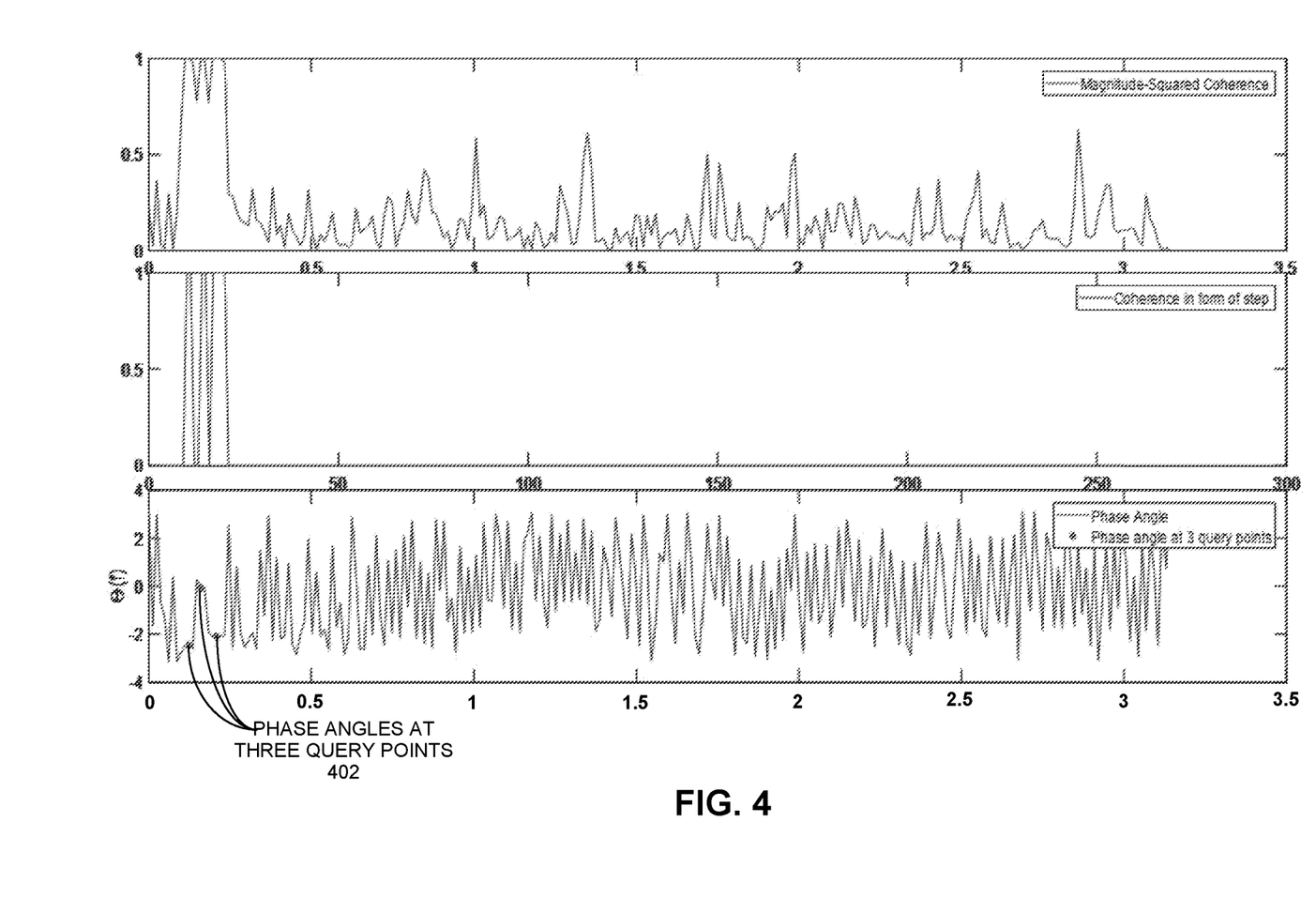
FIG. 4 presents graphs illustrating how the magnitude-squared coherence estimates are used to determine frequencies for seasonality modes and associated phase angles in accordance with the disclosed embodiments.

To help visualize this process, FIG. 4 presents graphs illustrating how the magnitude-squared coherence estimates are used to determine frequencies for seasonality modes and associated phase angles. In FIG. 4, the top graph illustrates a magnitude-squared coherence estimate of two signals (S1 and S2). The middle graph illustrates coherence estimates, which are converted into steps by applying a Heaviside step function. The bottom graph illustrates how the phase angle is determined at query points 402, which are associated with the largest value in every step in the middle graph. These phase angles can be used to determine corresponding lead/lag times for each individual sinusoidal wave.

The peaks of the magnitude-squared coherence are correlated with frequencies for which there exists a significant correlation among the signals. To make this high coherence stand out from the other coherence estimates, we process these coherence estimates using a Heaviside step function, in which we define a step value of 0.0 for correlations smaller than 0.9, and a step value of 1.0 for correlations larger than 0.9. The regions containing 1.0 values are then segmented and individually analyzed by checking for step discontinuities. Next, the system processes the steps by iteratively retrieving the magnitude-squared coherence estimates corresponding to each of the steps. For each step, the frequency associated with the maximum value of the magnitude-squared coherence estimates is determined and collected. The system then computes a CPSD of S1 and S2, and uses the computed CPSD to calculate the phase angles at the collected frequencies. (For example, see the phase angles at three query points 402 illustrated in FIG. 4). The quotient of the resulting phase angles and associated frequencies yields the corresponding lead/lag times.

Figure 5:
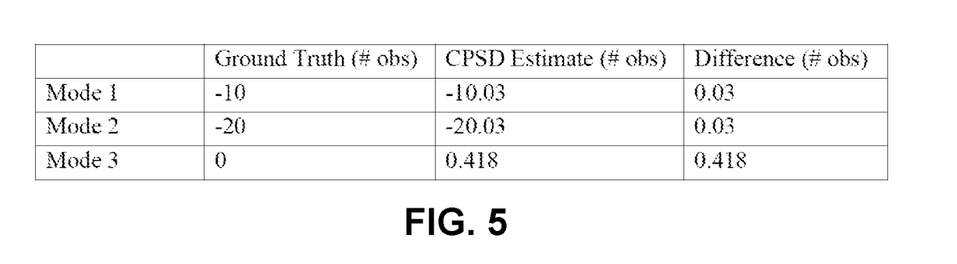
FIG. 5 presents a table illustrating a comparison between ground truth lead time and a lead time estimated using a CPSD-based approach in accordance with the disclosed embodiments.

Results for an exemplary computation for lead/lag times appears in the table in FIG. 5. In this exemplary compuation, synthetic composite signals were first constructed using the process illustrated in the flow chart in FIG. 2A. Because these signals were synthetically generated, we know the ground truth values for the lead/lag times. Note that the lead/lag time estimates produced by the new seasonality-characterization technique are very close to the original ground truth lead/lag times. The small differences in the lead/lag time estimates are caused by noise in the original signal, which leads to a small deviation of amplitude in the Fourier composite that affects the phase angle calculations, but with vanishingly small offsets in comparison to the ground truth values.

Additional details about the above-described seasonality-characterization technique are described in further detail below. However, we first describe an exemplary prognostic-surveillance system in which it operates.

Prognostic-Surveillance System

Figure 1:
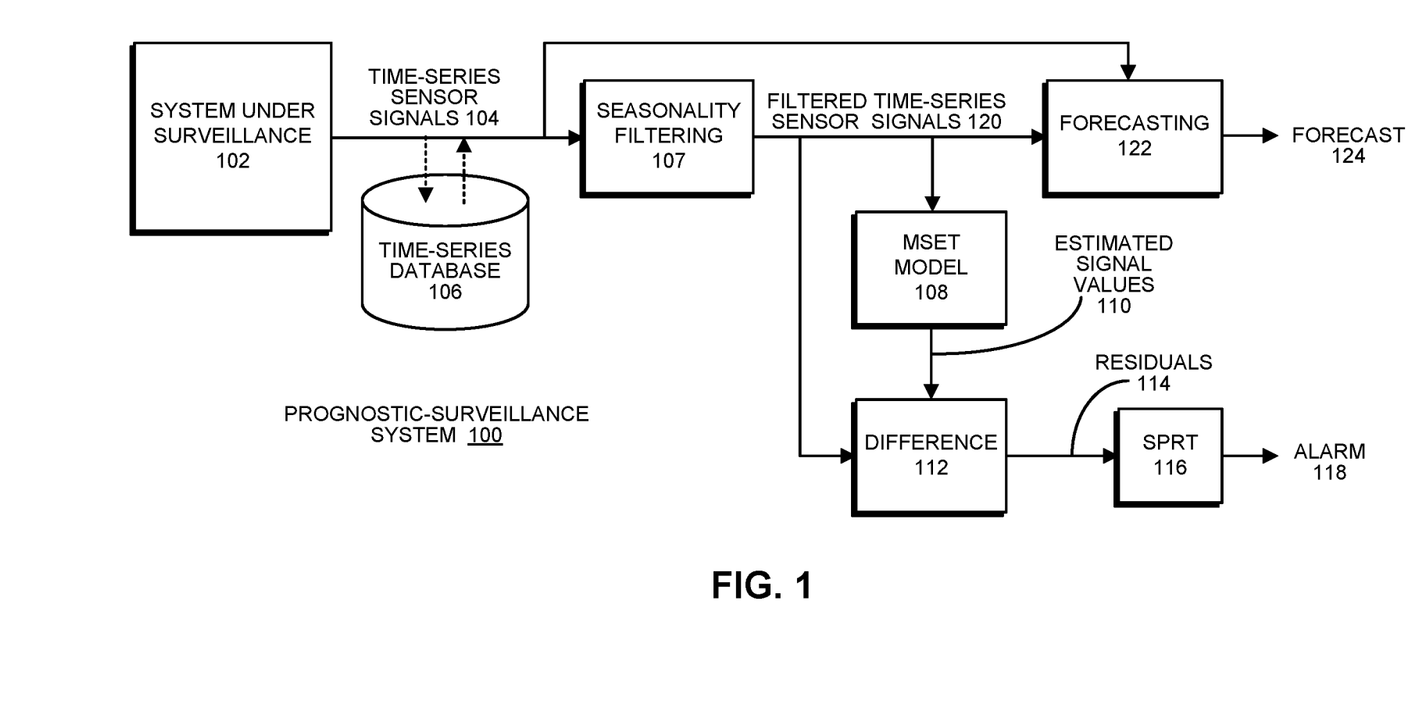
FIG. 1 illustrates an exemplary prognostic-surveillance system in accordance with the disclosed embodiments.

FIG. 1 illustrates an exemplary prognostic-surveillance system 100 in accordance with the disclosed embodiments. As illustrated in FIG. 1, prognostic-surveillance system 100 operates on a set of time-series sensor signals 104 obtained from sensors in a system under surveillance 102. System under surveillance 102 can generally include any type of machine or facility, which includes sensors and generates time-series signals. Moreover, time-series sensor signals 104 can originate from any type of sensor, which can be located in a component in the system under surveillance 102, including: a voltage sensor; a current sensor; a pressure sensor; a rotational speed sensor; and a vibration sensor.

During operation of prognostic-surveillance system 100, time-series sensor signals 104 can feed into a time-series database 106, which stores the time-series sensor signals 104 for subsequent analysis. Next, the time-series sensor signals 104 either feed directly from system under surveillance 102 or from time-series database 106 into a seasonality filtering module 107, which filters out the seasonality modes in time-series sensor signals 104 to produce filtered time-series sensor signals 120.

Filtered time-series sensor signals 120 can be used to perform various forecasting operations. This involves feeding filtered time-series sensor signals 120 into a forecasting module 122 to produce a forecast 124 for subsequent operation of system under surveillance 102.

Filtered time-series sensor signals 120 can also be used to perform prognostic-surveillance operations. This involves feeding filtered time-series sensor signals 120 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, including neural networks, support vector machines (SVMs), auto-associative kernel regression (AAKR), and even simple linear regression (LR).

MSET model 108 is "trained" to learn patterns of correlation among the filtered time-series sensor signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the estimated signal values 110 that are illustrated in FIG. 1. Next, the system uses a difference module 112 to perform a pairwise differencing operation between the actual signal values and the estimated signal values 110 to produce residuals 114. The system then performs a "detection operation" on the residuals 114 by using sequential probability ratio test (SPRT) module 116 to detect anomalies and possibly to generate an alarm 118. (For a description of the SPRT, please see Wald, Abraham. June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures, hopefully with enough lead time so that the problems can be avoided or proactively fixed while the anomalies are small, well before they cause catastrophic failures.

Prognostic-Surveillance Operations

Figure 6:
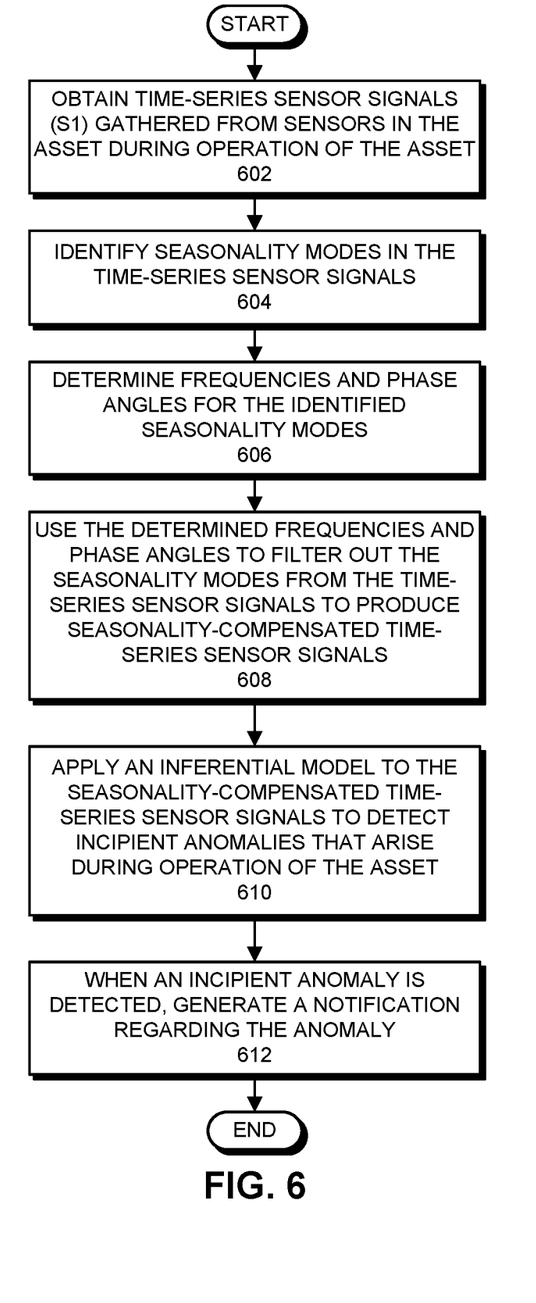
FIG. 6 presents a flow chart illustrating a process that performs seasonality-compensated prognostic-surveillance operations for an asset in accordance with the disclosed embodiments.

FIG. 6 presents a flow chart illustrating how a system performs seasonality-compensated prognostic-surveillance operations for an asset in accordance with the disclosed embodiments. During operation, the system obtains time-series sensor signals (S1) gathered from sensors in the asset during operation of the asset (step 602). Next, the system identifies seasonality modes in the time-series sensor signals (step 604). The system then determines frequencies and phase angles for the identified seasonality modes (step 606). Next, the system uses the determined frequencies and phase angles to filter out the seasonality modes from the time-series sensor signals to produce seasonality-compensated time-series sensor signals (step 608). The system then applies an inferential model to the seasonality-compensated time-series sensor signals to detect incipient anomalies that arise during operation of the asset (step 610). Finally, when an incipient anomaly is detected, the system generates a notification regarding the anomaly (step 612).

Figure 7:
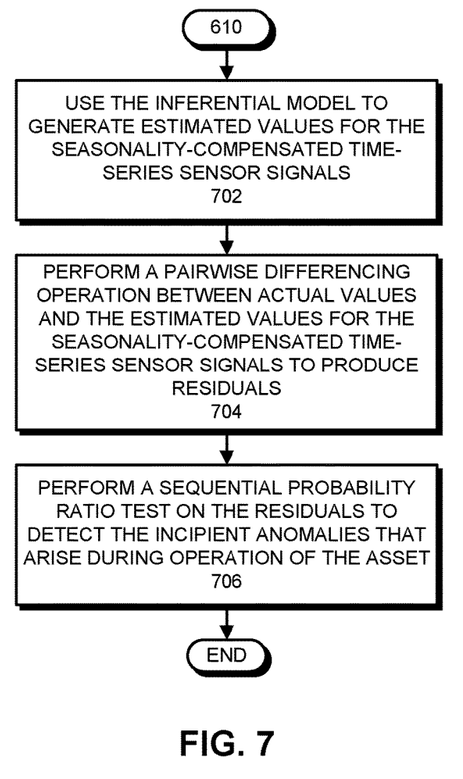
FIG. 7 presents a flow chart illustrating a process that applies an inferential model to the seasonality-compensated time-series sensor signals in accordance with the disclosed embodiments.

FIG. 7 presents a flow chart illustrating a process that applies the inferential model to the seasonality-compensated time-series sensor signals in accordance with the disclosed embodiments. (This flow chart illustrates in more detail the operations performed in step 610 in the flow chart that appears in FIG. 6.) During operation, the system uses the inferential model to generate estimated values for the seasonality-compensated time-series sensor signals (step 702). Next, the system performs a pairwise differencing operation between actual values and the estimated values for the seasonality-compensated time-series sensor signals to produce residuals (step 704). Finally, the system performs a sequential probability ratio test on the residuals to detect the incipient anomalies that arise during operation of the asset (step 706).

Figure 8:
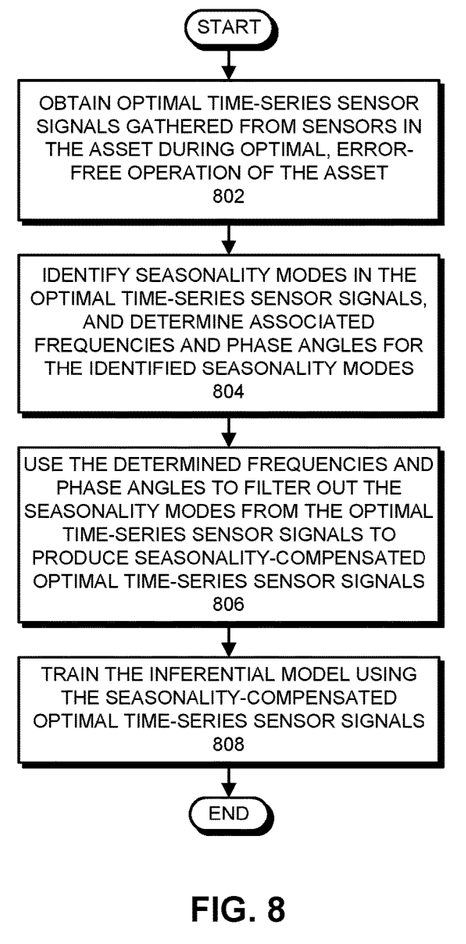
FIG. 8 presents a flow chart illustrating a process for training the inferential model to the optimal time-series sensor signals in accordance with the disclosed embodiments.

FIG. 8 presents a flow chart illustrating a process for training the inferential model in accordance with the disclosed embodiments. During this process, the system obtains optimal time-series sensor signals gathered from sensors in the asset during optimal, error-free operation of the asset (step 802). Next, the system identifies seasonality modes in the optimal time-series sensor signals, and determines associated frequencies and phase angles for the identified seasonality modes (step 804). The system then uses the determined frequencies and phase angles to filter out the seasonality modes from the optimal time-series sensor signals to produce seasonality-compensated optimal time-series sensor signals (step 806). Finally, the system trains the inferential model using the seasonality-compensated optimal time-series sensor signals (step 808).

Figure 9:
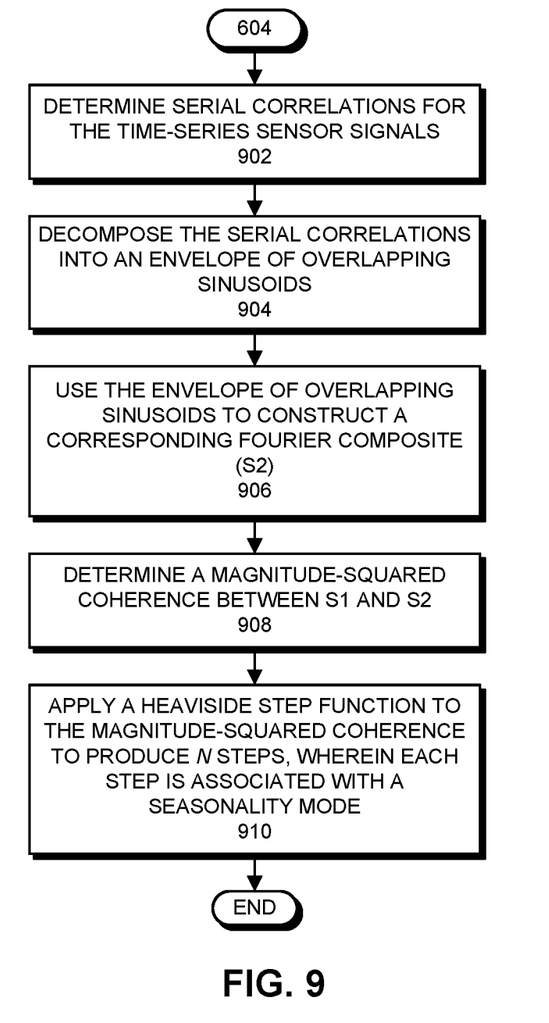
FIG. 9 presents a flow chart illustrating a process for identifying the seasonality modes in the time-series sensor signals in accordance with the disclosed embodiments.

FIG. 9 presents a flow chart illustrating a process for identifying the seasonality modes in the time-series sensor signals in accordance with the disclosed embodiments. (This flow chart illustrates in more detail the operations performed in step 604 in the flow chart that appears in FIG. 6.) During this process, the system determines serial correlations for the time-series sensor signals (step 902). Next, the system decomposes the serial correlations into an envelope of overlapping sinusoids (step 904). The system then uses the envelope of overlapping sinusoids to construct a corresponding Fourier composite (S2) (step 906). Next, the system determines a magnitude-squared coherence between S1 and S2 (step 908). Finally, the system applies a Heaviside step function to the magnitude-squared coherence to produce N steps, wherein each step is associated with a seasonality mode (step 910).

Figure 10:
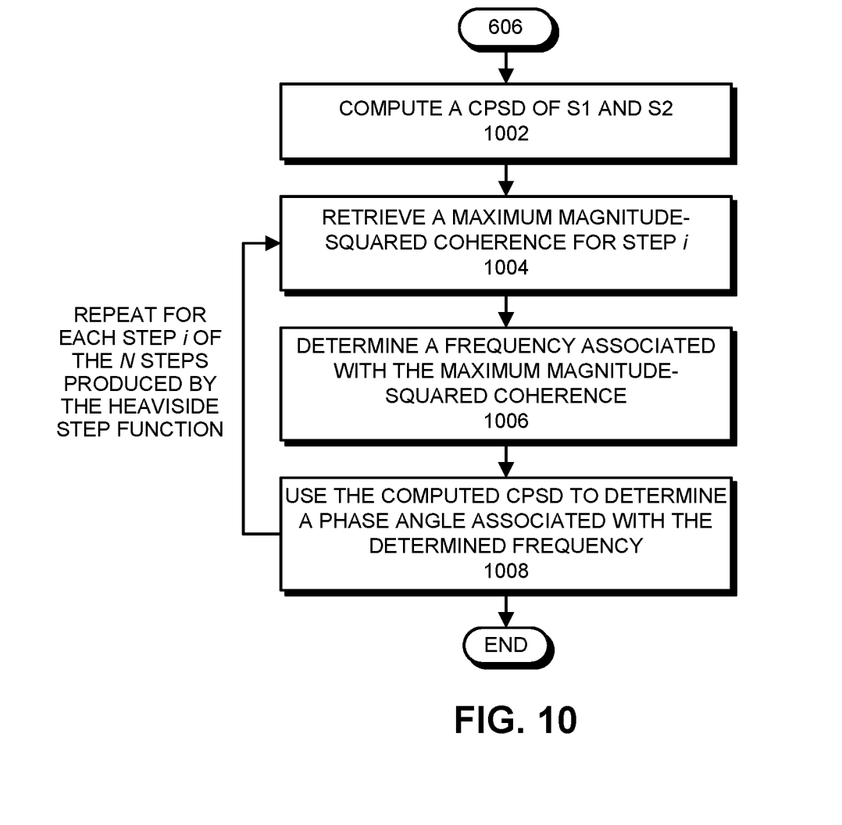
FIG. 10 presents a flow chart illustrating a process for determining frequencies and phase angles for the identified seasonality modes in accordance with the disclosed embodiments.

FIG. 10 presents a flow chart illustrating a process for determining frequencies and phase angles for the identified seasonality modes in accordance with the disclosed embodiments. (This flow chart illustrates in more detail the operations performed in step 606 in the flow chart that appears in FIG. 6.) The system first computes a CPSD of S1 and S2 (step 1002). Next, for each step i of the N steps produced by the Heaviside step function, the system performs the following operations. First, the system retrieves a maximum magnitude-squared coherence for step i (step 1004). The system then determines a frequency associated with the maximum magnitude-squared coherence (step 1006). Finally, the system uses the computed CPSD to determine a phase angle associated with the determined frequency (step 1008).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing seasonality-compensated prognostic-surveillance operations for an asset, comprising:
   obtaining time-series sensor signals (S1) gathered from sensors in the asset during operation of the asset;
   identifying two or more seasonality modes in the time-series sensor signals by:
      determining serial correlations for the time-series sensor signals;
      decomposing the serial correlations into an envelope of overlapping sinusoids; and using the envelope of overlapping sinusoids to construct a corresponding Fourier composite (S2);
determining frequencies and corresponding lead/lag times for the identified two or more seasonality modes;
using the determined frequencies and corresponding lead/lag times to filter out the identified two or more seasonality modes from the time-series sensor signals to produce seasonality-compensated time-series sensor signals, wherein determining both frequencies and corresponding lead/lag times for the identified seasonality modes improves accuracy in filtering out multiple seasonality modes from the time-series sensor signals;
applying an inferential model to the seasonality-compensated time-series sensor signals to detect incipient anomalies that arise during operation of the asset; and
when an incipient anomaly is detected, generating a notification regarding the anomaly.

2. The method of claim 1, wherein applying the inferential model to the seasonality-compensated time-series sensor signals involves:
using the inferential model to generate estimated values for the seasonality-compensated time-series sensor signals;
performing a pairwise differencing operation between actual values and the estimated values for the seasonality-compensated time-series sensor signals to produce residuals; and
performing a sequential probability ratio test on the residuals to detect the incipient anomalies that arise during operation of the asset.

3. The method of claim 1, wherein prior to obtaining time-series sensor signals, the method further comprises training the inferential model by:
obtaining optimal time-series sensor signals gathered from sensors in the asset during optimal, error-free operation of the asset;
identifying seasonality modes in the optimal time-series sensor signals;
determining associated frequencies and corresponding lead/lag times for the identified seasonality modes;
using the determined frequencies and corresponding lead/lag times to filter out the seasonality modes from the optimal time-series sensor signals to produce seasonality-compensated optimal time-series sensor signals; and
training the inferential model using the seasonality-compensated optimal time-series sensor signals.

4. The method of claim 1, wherein identifying the two or more seasonality modes in the time-series sensor signals further involves:
determining a magnitude-squared coherence between S1 and S2; and
applying a Heaviside step function to the magnitude-squared coherence to produce N steps, wherein each step is associated with a seasonality mode in the two or more seasonality modes.

5. The method of claim 4, wherein determining the associated frequencies and corresponding lead/lag times for the identified two or more seasonality modes comprises:
computing a cross power spectral density (CPSD) of S1 and S2; and
for each step i of the N steps produced by the Heaviside step function, performing the following operations,
retrieving a maximum magnitude-squared coherence for step i,
determining a frequency associated with the maximum magnitude- squared coherence, and
using the computed CPSD to determine a phase lead/lag associated with the determined frequency.

6. The method of claim 5, wherein while using the determined frequencies and corresponding lead/lag times to filter out the seasonality modes, the method further comprises converting each determined phase lead/lag into a corresponding lead/lag time by dividing each determined phase lead/lag by an associated frequency.

7. The method of claim 1, wherein the inferential model comprises a Multivariate State Estimation Technique (MSET) model.

8. The method of claim 1, wherein the incipient anomalies comprise indicators of an impending failure of the asset.

9. A non-transitory, computer-readable storage medium storing instructions that when executed by a computer cause the computer to perform a method for performing seasonality-compensated prognostic-surveillance operations for an asset, the method comprising:
obtaining time-series sensor signals (S1) gathered from sensors in the asset during operation of the asset;
identifying two or more seasonality modes in the time-series sensor signals by:
determining serial correlations for the time-series sensor signals;
decomposing the serial correlations into an envelope of overlapping sinusoids; and
using the envelope of overlapping sinusoids to construct a corresponding Fourier composite (S2);
determining frequencies and corresponding lead/lag times for the identified two or more seasonality modes;
using the determined frequencies and corresponding lead/lag times to filter out the identified two or more seasonality modes from the time-series sensor signals to produce seasonality-compensated time-series sensor signals, wherein determining both frequencies and corresponding lead/lag times for the identified seasonality modes improves accuracy in filtering out multiple seasonality modes from the time-series sensor signals;
applying an inferential model to the seasonality-compensated time-series sensor signals to detect incipient anomalies that arise during operation of the asset; and
when an incipient anomaly is detected, generating a notification regarding the anomaly.

10. The non-transitory, computer-readable storage medium of claim 9, wherein applying the inferential model to the seasonality-compensated time-series sensor signals involves:
using the inferential model to generate estimated values for the seasonality-compensated time-series sensor signals;
performing a pairwise differencing operation between actual values and the estimated values for the seasonality-compensated time-series sensor signals to produce residuals; and
performing a sequential probability ratio test on the residuals to detect the incipient anomalies that arise during operation of the asset.

11. The non-transitory, computer-readable storage medium of claim 9, wherein prior to obtaining time-series sensor signals, the method further comprises training the inferential model by:
obtaining optimal time-series sensor signals gathered from sensors in the asset during optimal, error-free operation of the asset;
identifying seasonality modes in the optimal time-series sensor signals;

determining associated frequencies and corresponding lead/lag times for the identified seasonality modes;

using the determined frequencies and corresponding lead/lag times to filter out the seasonality modes from the optimal time-series sensor signals to produce seasonality-compensated optimal time-series sensor signals; and training the inferential model using the seasonality-compensated optimal time-series sensor signals.

12. The non-transitory, computer-readable storage medium of claim 9, wherein identifying the two or more seasonality modes in the time-series sensor signals further involves:

determining a magnitude-squared coherence between S1 and S2; and applying a Heaviside step function to the magnitude-squared coherence to produce N steps, wherein each step is associated with a seasonality mode in the two or more seasonality modes.

13. The non-transitory, computer-readable storage medium of claim 12, wherein determining the associated frequencies and corresponding lead/lag times for the identified two or more seasonality modes comprises:

computing a CPSD of S1 and S2; and for each step i of the N steps produced by the Heaviside step function, performing the following operations, retrieving a maximum magnitude-squared coherence for step i, determining a frequency associated with the maximum magnitude-squared coherence, and using the computed CPSD to determine a phase lead/lag associated with the determined frequency.

14. The non-transitory, computer-readable storage medium of claim 9, wherein while using the determined frequencies and corresponding lead/lag times to filter out the seasonality modes, the method further comprises converting each determined phase lead/lag into a corresponding lead/lag time by dividing each determined phase lead/lag by an associated frequency.

15. The non-transitory, computer-readable storage medium of claim 9, wherein the inferential model comprises an MSET model.

16. The non-transitory, computer-readable storage medium of claim 9, wherein the incipient anomalies comprise indicators of an impending failure of the asset.

17. A system that performs seasonality-compensated prognostic-surveillance operations for an asset, comprising:

at least one processor and at least one associated memory; and a prognostic-surveillance mechanism that executes on the at least one processor, wherein during operation, the prognostic-surveillance mechanism:

obtains time-series sensor signals (S1) gathered from sensors in the asset during operation of the asset;

identifies two or more seasonality modes in the time-series sensor signals by:

determining serial correlations for the time-series sensor signals;

decomposing the serial correlations into an envelope of overlapping sinusoids; and using the envelope of overlapping sinusoids to construct a corresponding Fourier composite (S2);

determines frequencies and corresponding lead/lag times for the identified two or more seasonality modes;

uses the determined frequencies and corresponding lead/lag times to filter out the identified two or more seasonality modes from the time-series sensor signals to produce seasonality-compensated time-series sensor signals, wherein determining both frequencies and corresponding lead/lag times for the identified seasonality modes improves accuracy in filtering out multiple seasonality modes from the time-series sensor signals;

applies an inferential model to the seasonality-compensated time-series sensor signals to detect incipient anomalies that arise during operation of the asset; and when an incipient anomaly is detected, generates a notification regarding the anomaly.

18. The system of claim 17, wherein while applying the inferential model to the seasonality-compensated time-series sensor signals, the system:

uses the inferential model to generate estimated values for the seasonality-compensated time-series sensor signals;

performs a pairwise differencing operation between actual values and the estimated values for the seasonality-compensated time-series sensor signals to produce residuals; and performs a sequential probability ratio test on the residuals to detect the incipient anomalies that arise during operation of the asset.

19. The system of claim 17, wherein while identifying the two or more seasonality modes in the time-series sensor signals, the system:

determines serial correlations for the time-series sensor signals;

decomposes the serial correlations into an envelope of overlapping sinusoids;

uses the envelope of overlapping sinusoids to construct a corresponding Fourier composite (S2);

determines a magnitude-squared coherence between S1 and S2; and applies a Heaviside step function to the magnitude-squared coherence to produce N steps, wherein each step is associated with a seasonality mode in the two or more seasonality modes.

20. The system of claim 19, wherein while determining the associated frequencies and corresponding lead/lag times for the identified two or more seasonality modes, the system:

computes a CPSD of S1 and S2; and for each step i of the N steps produced by the Heaviside step function, performs the following operations, retrieves a maximum magnitude-squared coherence for step i, determines a frequency associated with the maximum magnitude-squared coherence, and uses the computed CPSD to determine a phase lead/lag associated with the determined frequency.

* * * * *

UNITED STATES PATENT AND TRADEMARK OFFICE
CERTIFICATE OF CORRECTION

| | | |
|---|---|---|
| PATENT NO. | : 12,086,693 B2 | Page 1 of 1 |
| APPLICATION NO. | : 16/419846 | |
| DATED | : September 10, 2024 | |
| INVENTOR(S) | : Wang et al. | |

It is certified that error appears in the above-identified patent and that said Letters Patent is hereby corrected as shown below:

In the Specification

In Column 6, Line 16, delete "compuation," and insert -- computation, --, therefor.

In the Claims

In Column 9, Line 67, in Claim 5, delete "magnitude- squared" and insert -- magnitude-squared --, therefor.

Signed and Sealed this
Twenty-eighth Day of January, 2025

Coke Morgan Stewart
*Acting Director of the United States Patent and Trademark Office*